No. 12,816. REISSUED JUNE 16, 1908.

H. S. COVER.

EYE GUARD.

APPLICATION FILED MAR. 23, 1908.

Witnesses.
Edward T. Wray.
Sophie B. Werner.

Inventor.
Harvey S. Cover.
by Parker & Carter
Attorneys.

UNITED STATES PATENT OFFICE.

HARVEY S. COVER, OF SOUTH BEND, INDIANA.

EYE-GUARD.

No. 12,816. Specification of Reissued Letters Patent. Reissued June 16, 1908.

Original No. 845,696, dated February 26, 1907, Serial No. 224,580. Application for reissue filed March 23, 1908. Serial No. 422,866.

*To all whom it may concern:*

Be it known that I, HARVEY S. COVER, a citizen of the United States, residing at South Bend, in the county of St. Joseph and State of Indiana, have invented certain new and useful Improvements in Eye-Guards, of which the following is a full, clear, and exact specification.

This invention relates to an eye guard or shield for firemen, metal workers, chauffeurs, and others who are likely to be subjected to the action of fumes, gases, grit, dust, etc.

The invention consists in providing an eye-guard of a single piece of rubber, which has two lens portions connected by an integral bridge-piece of greater flexibility than the lens portions, so that the lens portions can be folded one upon the other when not in use. Each lens portion has an integral flaring and yielding flange projecting inwardly and terminating in a flattened cushion, which snugly engages the flesh around the eye, so as to exclude dirt, dust, grit, or smoke therefrom, and the integral bridge-piece is so located and arranged as to form a recess for the bridge of the nose, so that the outer flange will engage the flesh at the side of the nose as well as the top and bottom of the eye.

For a full understanding of the merits and advantages of my invention reference is to be had to the following description and the accompanying drawings, in which—

Figure 1:
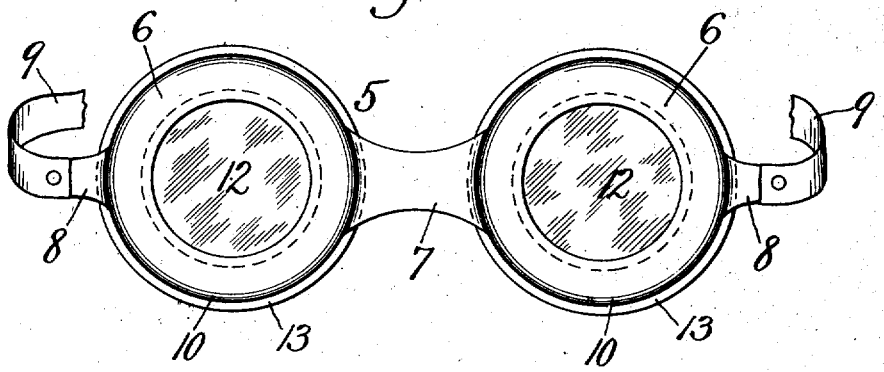
Figure 2:
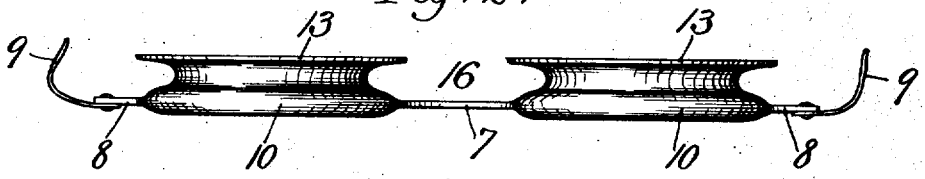
Figure 3:
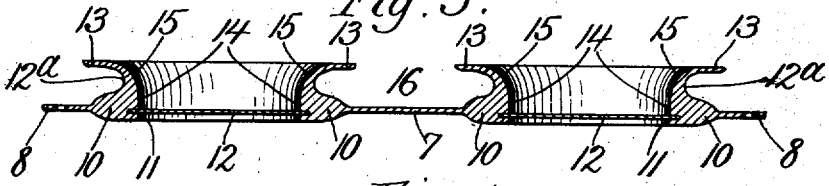

Figure 1 is a front elevation of the eye-guard. Fig. 2 is a plan view. Fig. 3 is a central longitudinal section, and Fig. 4 is a side elevation with the lens portions folded one upon the other.

Making renewed reference to the drawings, 5 designates a rubber frame, which consists of two ring members 6, connected by an integral bridge-piece 7 and having at their outer ends integral tabs or lips 8, adapted for connection with an elastic band 9, that encircles the head to hold the goggles or eye-shade upon the face. The ring members constitute lens portions, which are of such proportions as to form substantially a rigid lens-frame 10, the material (rubber) being thickened and possessing only a small amount of flexibility, and having annular grooves or recesses 11, into which may be sprung lenses 12 of mica or other suitable material, which are constrictively held in the grooves. Projecting inwardly from each of the solid lens portions is a yielding annular wall $12^a$, that terminates in an outwardly-reduced flange 13, that lies substantially in the same plane with the lenses and forms a flattened cushion for contact with the flesh around each eye. The inner surface of the walls of the ring members extends in a true transverse direction from the outer edge to about the center, as at 14, and then flares outwardly, as at 15, so as to gradually reduce the thickness of the intermediate wall $12^a$ and the flange 13, and thereby increase the flexibility and resultant cushioning effect of the flange 13.

Figure 4:
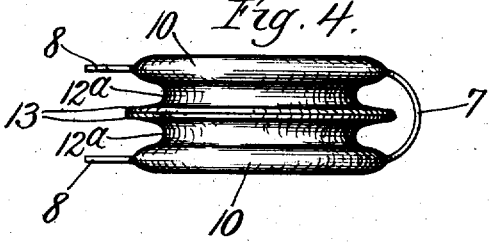

The bridge-piece 7, above referred to, preferably connects the ring members 6 near the outer side thereof or adjacent to the lens portions so that a recess or cavity 16 is provided for the bridge of the nose, thus permitting the flange 13 to snugly engage with the flesh at the sides of the nose, as well as above and beneath the eye, and this bridge-piece is of greater flexibility than the ring members, so that the latter may be folded, with the bridge-piece as a hinge, upon one another, as shown in Fig. 4, a convenient form for carrying the goggles in a garment-pocket and for packing in small boxes. From this construction it will be seen that the reduced thickness of the annular wall $12^a$ intermediate the flange and the lens portion produces a cushion, inasmuch as the frame will yield transversely at that point and accommodate itself to the irregularities of the face, and by means of the outwardly-flattened flange 13, an increased bearing-surface for the flesh is provided, thus preventing chafing or injury to the person's face.

I claim:

1. An eye-guard embodying lens portions each consisting of a solid ring member having an integral annular flange projecting substantially at right angles to the plane of the lens, and gradually tapering in thickness and terminating in a flat, yielding, outwardly-extending cushion which is disposed in a plane substantially parallel with the lens, and an integral bridge-piece connecting the ring members to provide a recess for the nose between the flanges and cushions, substantially as described.

2. An eye guard consisting of two lenses, a flexible piece embodying two lens holding portions, each consisting of a ring of elastic material adapted to constrictively hold one lens, a flat flexible annular cushion adapted to bear upon the flesh of the wearer about the eye, a thin compressible and elastic tubular flange connecting the ring and cushion, and a flexible bridge between the lens holding portions.

3. An eye guard consisting of two lenses, a flexible piece embodying two lens holding portions, each consisting of a ring of elastic material adapted to constrictively hold one lens, a flat flexible annular cushion adapted to bear upon the flesh of the wearer about the eye, a thin compressible and elastic tubular flange connecting the ring and cushion, and a flexible bridge between the rings of the lens holding portions.

HARVEY S. COVER.

Witnesses:
MINNIE M. LINDENAU,
SOPHIE B. WERNER.